(12) United States Patent
Girin et al.

(10) Patent No.: US 12,263,720 B2
(45) Date of Patent: Apr. 1, 2025

(54) SCAVENGING EXCESS COOLING OR HEATING FROM A THERMAL MANAGEMENT SYSTEM OF A NON-COMBUSTION POWER SOURCE FOR A MACHINE

(71) Applicant: Caterpillar Inc., Peoria, IL (US)

(72) Inventors: Cédric Girin, St. Martin d'Uriage (FR); Sylvain Errant, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 244 days.

(21) Appl. No.: 17/932,047

(22) Filed: Sep. 14, 2022

(65) Prior Publication Data
US 2024/0083217 A1  Mar. 14, 2024

(51) Int. Cl.
*B60H 1/00* (2006.01)

(52) U.S. Cl.
CPC ..... *B60H 1/00899* (2013.01); *B60H 1/00007* (2013.01); *B60H 1/00278* (2013.01); *B60H 2001/00307* (2013.01); *B60H 2001/00928* (2013.01)

(58) Field of Classification Search
CPC ............ B60H 1/00899; B60H 1/00007; B60H 1/00278; B60H 1/00378; B60H 1/143; B60H 2001/00307; B60H 2001/00928
See application file for complete search history.

(56) References Cited

U.S. PATENT DOCUMENTS

| | | |
|---|---|---|
| 5,469,820 A | 11/1995 | Data et al. |
| 8,899,062 B2 | 12/2014 | Kadle et al. |
| 9,308,828 B2 | 4/2016 | Wu et al. |
| 10,040,334 B2 | 8/2018 | Graaf et al. |
| 2012/0297809 A1* | 11/2012 | Carpenter ............... B60L 58/26 62/239 |
| 2014/0099521 A1 | 4/2014 | Kim et al. |
| 2021/0300146 A1 | 9/2021 | Ishizeki |
| 2021/0331553 A1* | 10/2021 | Healy ..................... B60L 58/27 |
| 2022/0032733 A1 | 2/2022 | Spangler et al. |

FOREIGN PATENT DOCUMENTS

| | | | | |
|---|---|---|---|---|
| CN | 205395697 U | * | 7/2016 | |
| CN | 207303289 U | * | 5/2018 | |
| CN | 210821729 U | * | 6/2020 | ......... B60H 1/00278 |
| CN | 210821736 U | * | 6/2020 | |
| CN | 112693363 A | * | 4/2021 | |
| CN | 113442679 A | * | 9/2021 | |

(Continued)

*Primary Examiner* — Emmanuel E Duke

(57) ABSTRACT

A fluid system may include a first fluid circuit configured to circulate a first fluid to cool or heat a non-combustion power source of a machine. The first fluid circuit may include at least one of a refrigeration unit to cool the first fluid or a heating unit to heat the first fluid. A cooling capacity of the refrigeration unit may exceed a cooling requirement of the non-combustion power source, or a heating capacity of the heating unit may exceed a heating requirement of the non-combustion power source. The fluid system may include a second fluid circuit configured to circulate a second fluid. The fluid system may include a heat exchanger in the first fluid circuit and in the second fluid circuit. The heat exchanger may be configured to cool or heat the second fluid using the first fluid.

20 Claims, 3 Drawing Sheets

(56) References Cited

FOREIGN PATENT DOCUMENTS

| | | | |
|---|---|---|---|
| CN | 113503660 A | * | 10/2021 |
| CN | 217347414 U | * | 9/2022 |
| DE | 102019107479 A1 | | 10/2019 |
| WO | 2021170213 A1 | | 9/2021 |
| WO | WO-2021184490 A1 | * | 9/2021 ......... B60H 1/00278 |

* cited by examiner

SCAVENGING EXCESS COOLING OR HEATING FROM A THERMAL MANAGEMENT SYSTEM OF A NON-COMBUSTION POWER SOURCE FOR A MACHINE

TECHNICAL FIELD

The present disclosure relates generally to thermal management of a non-combustion power source for a machine and, for example, to scavenging excess cooling or heating from a thermal management system of a non-combustion power source for a machine.

BACKGROUND

A non-combustion power source may include one or more batteries (e.g., lithium ion batteries) and/or one or more fuel cells, among other examples. Non-combustion power sources are used in mobile and stationary applications. Uses include hybrid and electric drive machines, as well as stationary power generation. Non-combustion power sources are designed to operate within a specific temperature range, and therefore may need to be heated when ambient temperature is low and cooled when ambient temperature is high. In addition, because non-combustion power sources generate heat during use, the non-combustion power sources may need to be cooled intermittently, as excess heat can degrade performance, safety, and operating life.

In some cases, a battery thermal management system (BTMS) may be used to provide cooling or heating to a non-combustion power source. The BTMS may include a chiller system to provide cooling and/or a heating system to provide heating. For example, the chiller system may include a refrigeration unit that is used to cool a coolant that is circulated around the non-combustion power source to remove heat. The BTMS may be sized for use across a variety of different machine types. As a result, the BTMS may have excess cooling or heating capacity when used with a particular machine, such as a machine powered by relatively few fuel cells and/or relatively few batteries. Operation of the BTMS (in particular, a compressor of the refrigeration unit of the BTMS), under conditions in which the cooling or heating capacity of the BTMS is not fully utilized, wastes power.

Moreover, in addition to a BTMS used for a non-combustion power source, some machines may include thermal management systems for cooling and/or heating other components or systems. For example, a machine may employ one or more thermal management systems for a hydraulic system, a powertrain, one or more electronic components (e.g., an alternator, an inverter, or the like), and/or an internal-combustion engine. These additional thermal management systems of the machine may have a large footprint, thereby increasing a size and weight of the machine, increasing a complexity of the machine, and constraining efficient utilization of machine space.

The control system of the present disclosure solves one or more of the problems set forth above and/or other problems in the art.

SUMMARY

A fluid system may include a first fluid circuit configured to circulate a first fluid to cool or heat a non-combustion power source of a machine. The first fluid circuit may include at least one of a refrigeration unit to cool the first fluid or a heating unit to heat the first fluid. A cooling capacity of the refrigeration unit may exceed a cooling requirement of the non-combustion power source, or a heating capacity of the heating unit may exceed a heating requirement of the non-combustion power source. The fluid system may include a second fluid circuit configured to circulate a second fluid. The fluid system may include a heat exchanger in the first fluid circuit and in the second fluid circuit. The heat exchanger may be configured to cool or heat the second fluid using the first fluid.

A method may include obtaining, by a controller, at least one of first temperature information relating to a non-combustion power source of a machine, second temperature information relating to a first fluid, circulated in a first fluid circuit, used to cool or heat the non-combustion power source, or third temperature information relating to a second fluid in a second fluid circuit. The method may include causing, by the controller and based on at least one of the first temperature information, the second temperature information, or the third temperature information, at least one of the first fluid or the second fluid to be directed to a heat exchanger, in the first fluid circuit and in the second fluid circuit, to cool or heat the second fluid using the first fluid.

A control system may include a first fluid circuit configured to circulate a first fluid to cool or heat a non-combustion power source of a machine. The first fluid circuit may include at least one of a refrigeration unit to cool the first fluid or a heating unit to heat the first fluid. The control system may include a second fluid circuit configured to circulate a second fluid. The control system may include a heat exchanger in the first fluid circuit and in the second fluid circuit. The heat exchanger may be configured to cool or heat the second fluid using the first fluid. The control system may include a controller configured to cause, using at least one of a first control valve in the first fluid circuit upstream of the heat exchanger or a second control valve in the second fluid circuit upstream of the heat exchanger, at least one of the first fluid or the second fluid to be directed to the heat exchanger.

DETAILED DESCRIPTION

This disclosure relates to a control system, which is applicable to any machine that is powered by a non-combustion power source. For example, the machine may be a vehicle, a compactor machine, a paving machine, a cold planer, a grading machine, a backhoe loader, a wheel loader, a harvester, an excavator, a motor grader, a skid steer loader, a tractor, a dozer, or the like.

Figure 1:
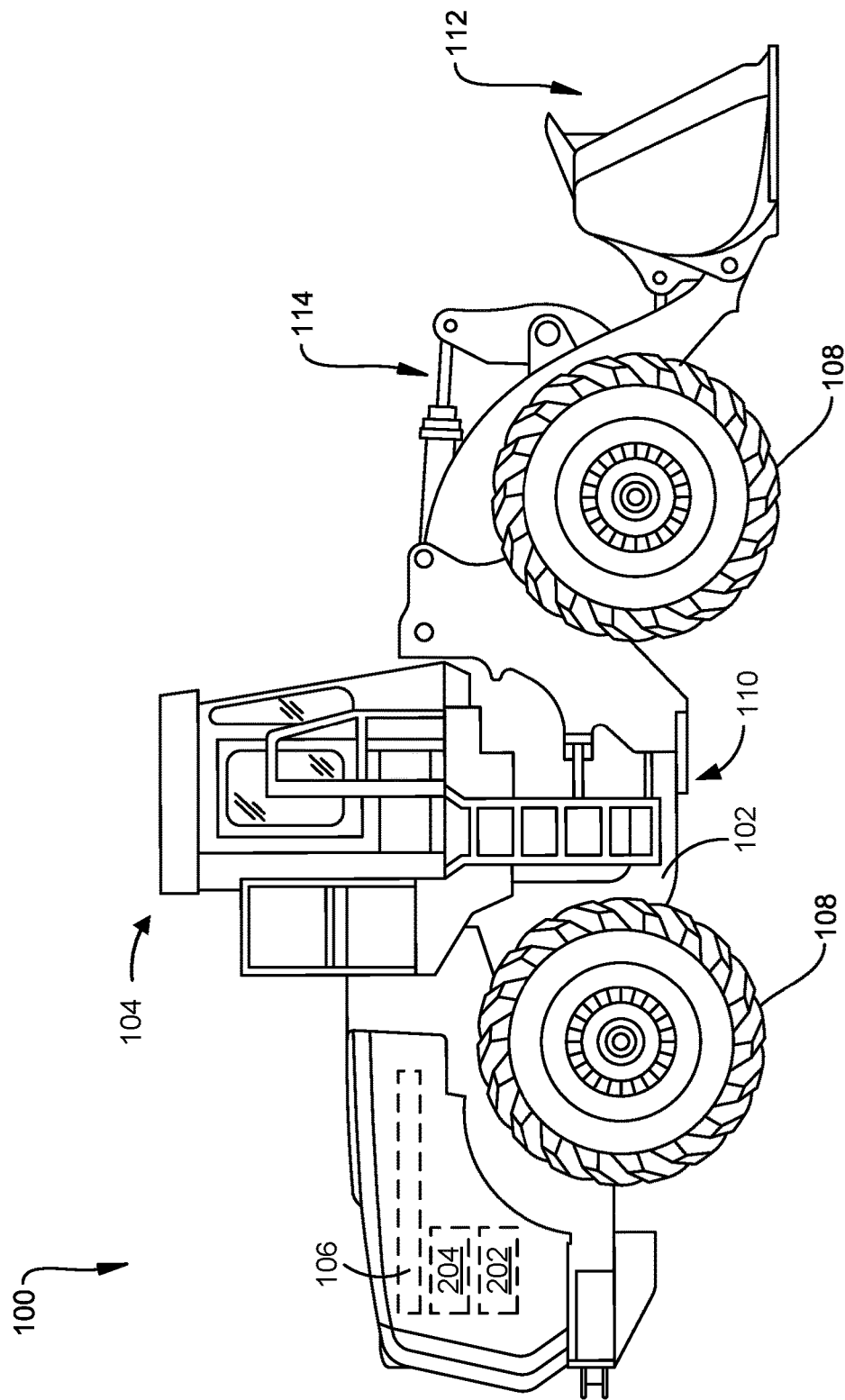
FIG. 1 shows an example machine.

FIG. 1 shows an example machine 100. The machine 100 includes a frame 102 with an operator cab 104. The operator cab 104 provides an enclosure to house one or more operators of the machine 100. The operator cab 104 may include a plurality of control elements, such as a joystick, a lever, a switch, a button, a monitor, a touch screen, or the like, that can be utilized by an operator to control and operate the work machine. In some examples, the machine 100 may be configured to allow for remote operation, such that the operator may control the machine 100 from a location other than the operator cab 104. In some examples, the machine 100 may be configured to operate autonomously, such that the operator cab 104 may be eliminated or provisioned with a reduced set of control elements.

The machine 100 includes a non-combustion power source 106 mounted on or within the frame 102. The non-combustion power source 106 may include one or more batteries (e.g., connected in parallel) and/or one or more fuel cells, among other examples. In the case of batteries, the machine 100 may include a port (not shown) used for charging the batteries. In the case of fuel cells, the machine 100 may include a fuel tank (not shown) that stores fuel for the fuel cells. The non-combustion power source 106 supplies the power for operating various systems of the machine 100. For example, the machine 100 may be a battery electric machine (BEM) or a fuel cell electric machine (FCEM).

A set of ground engaging elements 108, shown as wheels, are mounted to the frame 102. The ground engaging elements 108 may additionally or alternatively include tracks, skids, or the like. The ground engaging elements 108 may be driven by one or more drive motors (not shown) that are operably coupled to the non-combustion power source 106. When the drive motors are energized, the drive motors cause the ground engaging elements 108 to rotate to enable the machine 100 to traverse a surface.

The non-combustion power source 106 may provide power to a powertrain 110 of the machine 100. The powertrain 110 may include the non-combustion power source 106, the drive motors, a transmission (e.g., an electric transmission), a reduction drive, an inverter, a drive shaft, one or more axles, and/or other components associated with an electric drive system of machine 100. The powertrain 110 may include one or more fluid circuits in which lubricant (e.g., oil) is circulated to provide lubrication to components of the powertrain 110. The lubricant may accumulate waste heat from the powertrain 110 during operation of the machine 100 and/or may provide heat to the powertrain 110 in low-temperature settings. In some examples, the powertrain 110 may include an internal combustion engine (not shown) for hybrid powering (e.g., with the non-combustion power source 106) of the machine 100. A cooling and/or heating fluid circuit associated with the engine may circulate a coolant fluid to cool or heat the engine.

The machine 100 may include a work implement 112, such as a bucket, coupled to the frame 102 (e.g., via a linkage assembly). The work implement 112 may be operable by a hydraulic system 114. The hydraulic system 114 may be controlled by one or more pumps powered by one or more motors to circulate hydraulic fluid in one or more hydraulic fluid circuits to cause actuation of the work implement 112. The hydraulic system 114, additionally or alternatively, may provide operation of a brake system of the machine 100, a suspension system of the machine 100, or the like. The hydraulic fluid may accumulate heat from the hydraulic system 114 during operation of the machine 100 and/or may provide heat to the hydraulic system 114 in low-temperature settings. In some examples, the hydraulic system 114 may include a cooling and/or heating fluid circuit that circulates a coolant fluid to cool or heat the hydraulic system 114.

The machine 100 may include one or more additional cooling and/or heating fluid circuits that circulate a fluid (e.g., a coolant fluid) to cool or heat one or more systems of the machine 100. For example, the cooling and/or heating fluid circuits may be configured to cool or heat electronic components of the machine 100 (e.g., an inverter, a motor, or the like), an air system of the machine 100 (e.g., a turbo system, an exhaust system, an air intake system, an operator cab air system, or the like), and/or the operator cab 104, among other examples. The machine 100 may include a controller 202 and a fluid system 204, as described in connection with FIG. 2.

As indicated above, FIG. 1 is provided as an example. Other examples may differ from what is described with regard to FIG. 1.

Figure 2:
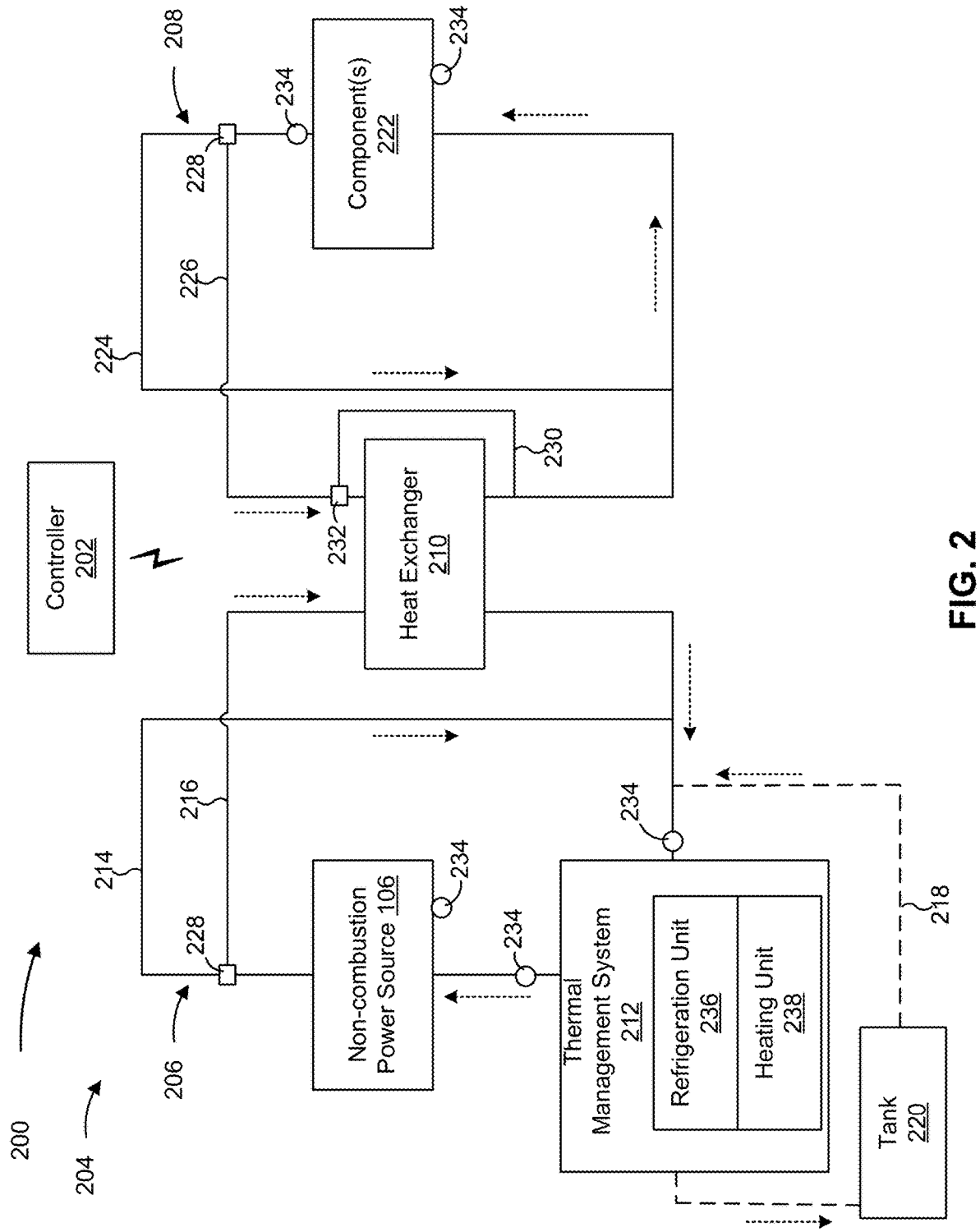
FIG. 2 shows an example control system.

FIG. 2 shows an example control system 200. The control system 200 may include the controller 202 (e.g., an electronic control module (ECM)). The controller 202 may include one or more memories and one or more processors communicatively coupled to the one or more memories. The one or more processors may perform operations described herein based on information stored in the one or more memories. For example, the one or more processors may be configured to perform operations associated with scavenging excess cooling or heating, as described herein.

The control system 200 may include the fluid system 204. The fluid system 204 may include a first fluid circuit 206 configured to circulate a first fluid and a second fluid circuit 208 configured to circulate a second fluid (e.g., which may be a same type of fluid as the first fluid or a different type of fluid than the first fluid). The fluid system 204 may also include a heat exchanger 210 that is in both the first fluid circuit 206 and the second fluid circuit 208. The heat exchanger 210 may be a liquid-to-liquid heat exchanger (e.g., a shell and tube heat exchanger or a plate heat exchanger, among other examples). For example, the heat exchanger 210 may be configured to cool or heat the second fluid using the first fluid.

The first fluid circuit 206 may be configured to circulate the first fluid to cool or heat the non-combustion power source 106. For example, the first fluid circuit 206 may be configured such that the first fluid absorbs heat from the non-combustion power source 106 and/or the first fluid conducts or radiates heat to the non-combustion power source 106. As an example, the first fluid circuit 206 may include a cooling or heating section (e.g., that includes one or more thermally conductive fluid passages, a radiator, and/or a heat exchanger, among other examples) that contacts, that passes through, or that is positioned to thermally affect, the non-combustion power source 106. The first fluid may be a liquid, such as water, glycol, propylene glycol, ethylene glycol, a refrigerant, or a combination thereof.

The first fluid circuit 206 may include a thermal management system 212 (e.g., a BTMS). The thermal management system 212 may include a refrigeration unit 236 (e.g., a chiller system) configured to cool the first fluid and/or a heating unit 238 configured to heat the first fluid. The refrigeration unit 236 may include a compressor, a condenser, and/or an evaporator, among other examples, configured to perform a refrigeration cycle with a refrigerant. The heating unit 238 may include a heating element or another device that generates heat. In some examples, the thermal management system 212 may include only the refrigeration unit 236 and not the heating unit. In some other examples, the thermal management system 212 may include both the refrigeration unit 236 and the heating unit 238. The thermal management system 212 may also include one or more pumps to circulate the first fluid and/or one or more passive thermal management components (e.g., a radiator, a heat sink, or the like). The first fluid may enter the thermal management system 212 at an inlet of the thermal management system 212. In the thermal management system 212, the first fluid may be cooled by the refrigeration unit 236 or heated by the heating unit 238, depending on whether cooling or heating of the non-combustion power source 106 is being performed, and the first fluid may exit the thermal management system 212 at an outlet of the thermal management system 212.

In some implementations, a cooling capacity of the refrigeration unit 236 may exceed a cooling requirement of the non-combustion power source 106, or a heating capacity of the heating unit 238 may exceed a heating requirement of the non-combustion power source 106, as described below. The cooling capacity of the refrigeration unit 236 refers to an amount of heat that the refrigeration unit can remove (e.g., from a defined space) over time. The heating capacity of the heating unit 238 refers to an amount of heat that the heating unit can provide (e.g., to a defined space) over time. The cooling capacity of the refrigeration unit 236 may exceed the cooling requirement of the non-combustion power source 106 when the refrigeration unit 236 has an ability to remove heat (e.g., over a time period) that is greater than an amount of heat that needs to be removed (e.g., over the time period) to bring a temperature of the non-combustion power source 106 to a threshold temperature. The heating capacity of the heating unit 238 may exceed the heating requirement of the non-combustion power source 106 when the heating unit 238 has an ability to provide heat (e.g., over a time period) that is greater than an amount of heat that needs to be provided (e.g., over the time period) to bring a temperature of the non-combustion power source 106 to a threshold temperature.

The first fluid circuit 206 may include at least a first path 214 and a second path 216. For example, downstream of the non-combustion power source 106, the first fluid circuit 206 may branch to the first path 214 and to the second path 216, and the first path 214 and the second path 216 may re-combine upstream of the thermal management system 212. The first path 214 may include the thermal management system 212 (e.g., the refrigeration unit 236 and/or the heating unit 238) and the cooling or heating section (and/or the non-combustion power source 106). In some implementations, the first path 214 may also include one or more electronic components (not shown) associated with the non-combustion power source 106, such as an alternator, an inverter, or the like. The second path 216 may include the thermal management system 212 (e.g., the refrigeration unit 236 and/or the heating unit 238), the cooling or heating section (and/or the non-combustion power source 106), and the heat exchanger 210. That is, after providing cooling or heating to the non-combustion power source 106, the first fluid may flow to the heat exchanger 210 via the second path 216.

In some implementations, the first fluid circuit 206 may include a third path 218 that includes a tank 220 (e.g., a shunt tank or an expansion tank). The thermal management system 212 may be configured to direct excess first fluid in the first fluid circuit 206, due to expansion of the first fluid, to the tank 220.

In some implementations, the second fluid circuit 208 may be configured to circulate the second fluid to cool or heat one or more components 222. That is, the second fluid circuit 208 may be a cooling and/or heating circuit for the component(s) 222. For example, the component(s) 222 may include an electronic system of the machine 100 (e.g., an inverter or a motor, among other examples), an engine of the machine 100, the hydraulic system 114, and/or an air system of the machine 100 (e.g., an exhaust system, a turbo system, an air intake system, or an operator cab air system, among other examples). The second fluid circuit 208 may include, upstream of the component(s) 222, one or more passive thermal management components (not shown), such as a radiator, a heat exchanger, or the like, and/or one or more active thermal management components (not shown) similar to the thermal management system 212. Here, the second fluid may be a liquid, such as water, glycol, propylene glycol, ethylene glycol, a refrigerant, or a combination thereof.

Additionally, or alternatively, the second fluid circuit 208 may be configured to circulate the second fluid in connection with operation of the component(s) 222. That is, the second fluid circuit 208 may be configured to circulate the second fluid for use by or in the component(s) 222. For example, the component(s) 222 may include the hydraulic system 114 and/or the powertrain 110, among other examples. As one example, the second fluid may be a lubricant (e.g., oil), and the second fluid circuit 208 may be configured to circulate the lubricant in the powertrain 110. As another example, the second fluid may be hydraulic fluid, and the second fluid circuit 208 may be configured to circulate the hydraulic fluid in the hydraulic system 114.

The second fluid circuit 208 may include at least a first path 224 and a second path 226. For example, downstream of the component(s) 222, the second fluid circuit 208 may branch to the first path 224 and to the second path 226, and the first path 224 and the second path 226 may re-combine upstream of the component(s) 222 (e.g., upstream of one or more passive thermal management components and/or one or more active thermal management components if present in the second fluid circuit 208). The first path 224 may include the component(s) 222 (and one or more passive thermal management components and/or one or more active thermal management components if present in the second fluid circuit 208). The second path 226 may include the component(s) 222 (and one or more passive thermal management components and/or one or more active thermal management components if present in the second fluid circuit 208) and the heat exchanger 210. That is, the second fluid may flow to the heat exchanger 210, via the second path 226, to be cooled or heated by the first fluid.

The fluid system 204 may include one or more control valves 228. The first fluid circuit 206 may include a control valve 228 (e.g., a three-way valve) upstream of the heat exchanger 210. For example, the control valve 228 may control fluid flow in the second path 216 of the first fluid circuit 206 upstream of the heat exchanger 210 (and/or control fluid flow in the first path 214). This control valve 228 may be configured to actuate between a closed position, that prevents the first fluid flowing to the heat exchanger 210, and an open position that allows the first fluid to flow to the heat exchanger. In some examples, respective control valves 228 may be in each of the first path 214 and the second path 216 where the first path 214 and the second path 216 branch from each other. Additionally, or alternatively, the second fluid circuit 208 may include a control valve 228 (e.g., a three-way valve) upstream of the heat exchanger 210. For example, the control valve 228 may control fluid flow in the second path 226 of the second fluid circuit 208 upstream of the heat exchanger 210 (and/or control fluid flow in the first path 224). This control valve 228 may be configured to actuate between a closed position, that prevents the second fluid flowing to the heat exchanger 210, and an open position that allows the second fluid to flow to the heat exchanger. In some examples, respective control valves 228 may be in each of the first path 224 and the second path 226 where the first path 224 and the second path 226 branch from each other. In this way, the control valve(s) 228 facilitate control over when the heat exchanger 210 is used to cool or heat the second fluid using the first fluid.

The second fluid circuit 208 may include a bypass passage 230 that is controlled by a bypass valve 232. The bypass passage 230 may be configured to bypass the heat exchanger 210. For example, the bypass passage 230 may enable the second fluid to entirely bypass the heat exchanger 210 or to partially bypass the heat exchanger 210 (e.g., some of the second fluid bypasses the heat exchanger 210 via the bypass passage 230 and some of the second fluid flows through the heat exchanger 210). The bypass valve 232 may be configured to actuate between a closed position, that prevents the second fluid flowing to the heat exchanger 210, and an open position that allows the second fluid to flow to the heat exchanger 210. A degree of the open position (e.g., 10% open, 50% open, 90% open, 100% open, etc.) may dictate an amount of the second fluid that flows through the heat exchanger 210 and an amount of the second fluid that bypasses the heat exchanger 210. In this way, an extent to which the second fluid is cooled or heated by the first fluid may be controlled. For example, if the second fluid needs minimal cooling, then the bypass valve 232 may be open a small amount so that only a small portion of the second fluid is cooled in the heat exchanger 210.

The fluid system 204 may include one or more temperature sensors 234. For example, the fluid system 204 may include a first temperature sensor 234 configured to detect a temperature of the first fluid at the inlet of the thermal management system 212, a second temperature sensor 234 configured to detect a temperature of the first fluid at the outlet of the thermal management system 212, a third temperature sensor 234 configured to detect a temperature of the non-combustion power source 106, a fourth temperature sensor 234 configured to detect a temperature of the component(s) 222, and/or a fifth temperature sensor 234 configured to detect a temperature of the second fluid (e.g., upstream of the component(s) 222 or downstream of the component(s) 222).

The controller 202 may be communicatively coupled (e.g., by an electrical connection and/or by a wireless connection) to the thermal management system 212. This may enable the controller 202 to control powering on and powering off of the refrigeration unit and/or the heating unit. The controller 202 also may be communicatively coupled (e.g., by an electrical connection and/or by a wireless connection) to the control valves 228, the bypass valve 232, and/or the temperature sensors 234. This may enable the controller 202 to control the control valves 228 and/or the bypass valve 232, and/or to obtain information from the temperature sensors 234.

For example, the controller 202 may obtain, from one or more temperature sensors 234, first temperature information relating to the non-combustion power source 106 (e.g., indicating a temperature detected at the non-combustion power source 106), second temperature information relating to the first fluid (e.g., indicating a temperature of the first fluid), and/or third temperature information relating to the second fluid (e.g., indicating a temperature of the second fluid). In some implementations, the second temperature information may indicate an inlet temperature of the first fluid at the inlet of the thermal management system 212 (e.g., the inlet of the refrigeration unit and/or the heating unit) and an outlet temperature of the first fluid at the outlet of the thermal management system 212 (e.g., the outlet of the refrigeration unit and/or the heating unit).

The controller 202 may cause powering on of the refrigeration unit based on the first temperature information being above a cooling threshold (and powering off of the refrigeration unit based on the first temperature information not being above the cooling threshold). Similarly, the controller 202 may cause powering on of the heating unit based on the first temperature information being below a heating threshold (and powering off of the heating unit based on the first temperature information not being below the heating threshold). The refrigeration unit and the heating unit may consume significant power when powered on. When the cooling capacity of the refrigeration unit exceeds the cooling requirement of the non-combustion power source 106 or the heating capacity of the heating unit exceeds the heating requirement of the non-combustion power source 106, this power consumption is not efficiently utilized if the thermal management system 212 is used to cool or heat only the non-combustion power source 106.

Based on the first temperature information, the second temperature information, and/or the third temperature information, the controller 202 may determine that the first fluid is to be used to cool or heat the second fluid in the heat exchanger 210 (e.g., if the first temperature information, the second temperature information, and/or the third temperature information satisfies a respective threshold). In some implementations, based on the inlet temperature and the outlet temperature, the controller 202 may determine that the cooling capacity of the thermal management system 212 (e.g., of the refrigeration unit) exceeds the cooling requirement of the non-combustion power source 106 or that the heating capacity of the thermal management system 212 (e.g., of the heating unit) exceeds the heating requirement of the non-combustion power source 106. This determination may be further based on a flow rate of the first fluid through the thermal management system 212 (e.g., through the refrigeration unit or the heating unit).

That is, the controller 202 may determine the cooling requirement and/or the heating requirement of the non-combustion power source 106 based on (e.g., as a function of) the inlet temperature, the outlet temperature, and/or the flow rate. The controller 202 may be provisioned with information indicating the cooling capacity and/or the heating capacity of the thermal management system 212, or the controller 202 may determine (e.g., estimate) the cooling capacity and/or the heating capacity of the thermal management system 212 (e.g., based on historical operation of the thermal management system 212 and/or in connection with a calibration and/or a test of the thermal management system 212).

Based on the first temperature information, the second temperature information, and/or the third temperature information, the controller 202 may cause the first fluid and/or the second fluid to be directed to the heat exchanger 210 to cool or heat the second fluid using the first fluid. For example, the controller 202 may cause the first fluid and/or the second fluid to be directed to the heat exchanger 210 based on the first temperature information satisfying a first threshold, the second temperature information satisfying a second threshold, and/or the third temperature information satisfying a third threshold. In particular, the controller 202 may cause the first fluid and/or the second fluid to be directed to the heat exchanger 210 based on determining that the cooling capacity of the refrigeration unit exceeds the cooling requirement or the heating capacity of the heating unit exceeds the heating requirement.

The controller 202 may cause the first fluid and/or the second fluid to be directed to the heat exchanger 210 using the control valve 228 in the first fluid circuit 206 and/or the control valve 228 in the second fluid circuit 208. In particular, the controller 202 may cause the first fluid and/or the second fluid to be directed to the heat exchanger 210 by causing actuation of the control valve 228 in the first fluid circuit 206 and/or the control valve 228 in the second fluid circuit 208. For example, if the second fluid circuit 208 does not include a control valve 228 (e.g., the second fluid is not restricted from flowing to the heat exchanger 210), then the controller 202 may cause the first fluid to be directed to the heat exchanger 210.

In some implementations, the controller 202 may cause a first portion of the second fluid to be directed to the heat exchanger 210 and a second portion of the second fluid to bypass the heat exchanger 210. The controller 202 may cause the first portion to be directed to the heat exchanger 210 and the second portion to bypass the heat exchanger 210 based on the first temperature information, the second temperature information, and/or the third temperature information. For example, if a temperature of the non-combustion power source 106 is within a threshold amount of the cooling requirement or the heating requirement of the non-combustion power source 106 (e.g., the cooling requirement or the heating requirement is nearly satisfied), then less of the second fluid may be caused to bypass the heat exchanger 210 (e.g., the first portion may be greater than 50% of the second fluid and the second portion may be less than 50% of the second fluid) to provide greater cooling or heating of the second fluid. Conversely, if the temperature of the non-combustion power source 106 is not within the threshold amount, then more of the second fluid may be caused to bypass the heat exchanger 210 (e.g., the first portion may be less than 50% of the second fluid and the second portion may be greater than 50% of the second fluid) to provide lesser cooling or heating of the second fluid (e.g., so that greater cooling or heating of the non-combustion power source 106 occurs). To cause the first portion to be directed to the heat exchanger 210 and the second portion to bypass the heat exchanger 210, the controller 202 may cause actuation of the bypass valve 232 (e.g., by opening or closing the bypass valve 232 to a particular percentage according to amounts of the first portion and the second portion determined by the controller 202).

By causing the first fluid and/or the second fluid to be directed to the heat exchanger 210, the second fluid may be cooled or heated as desired. In this way, additional cooling of the second fluid, than an amount of cooling that is possible without the heat exchanger 210, may be achieved. Similarly, additional heating of the second fluid, than an amount of heating that is possible without the heat exchanger 210, may be achieved. Moreover, even if the machine 100 is off or idling, the second fluid may be heated using techniques described herein because the second fluid circuit 208 may be driven by one or more electric pumps.

In some implementations, the heat exchanger 210 may be configured to cool or heat the first fluid using the second fluid, in a similar manner as described above. For example, the controller 202 may cause the first fluid and/or the second fluid to be directed to the heat exchanger 210 to cause cooling or heating of the first fluid using the second fluid, in a similar manner as described above. This may be based on the first temperature information, the second temperature information, and/or the third temperature information, in a similar manner as described above (e.g., using reversed logic from that described above). By using the heat exchanger 210 to cool or heat the first fluid using the second fluid, a temperature of the non-combustion power source 106 may be regulated without powering on the thermal management system 212, thereby conserving power. This may be useful in cold weather conditions to heat the non-combustion power source 106 and/or useful for speeding the cooling down of the non-combustion power source 106 upon shutting down the machine 100.

As indicated above, FIG. 2 is provided as an example. Other examples may differ from what is described with regard to FIG. 2.

Figure 3:
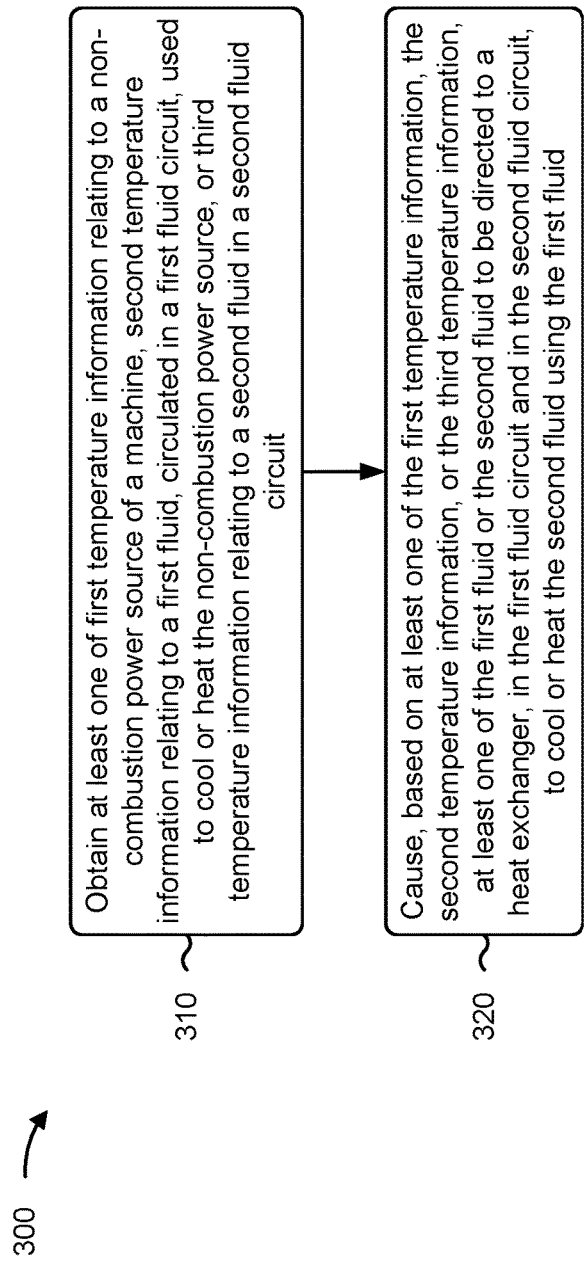
FIG. 3 is a flowchart of an example process associated with scavenging excess cooling or heating from a thermal management system of a non-combustion power source for a machine.

FIG. 3 is a flowchart of an example process 300 associated with scavenging excess cooling or heating from a thermal management system of a non-combustion power source for a machine. One or more process blocks of FIG. 3 may be performed by a controller (e.g., controller 202). Additionally, or alternatively, one or more process blocks of FIG. 3 may be performed by another device or a group of devices separate from or including the controller, such as another device or component that is internal or external to the machine 100.

As shown in FIG. 3, process 300 may include obtaining at least one of first temperature information relating to a non-combustion power source of a machine, second temperature information relating to a first fluid, circulated in a first fluid circuit, used to cool or heat the non-combustion power source, or third temperature information relating to a second fluid in a second fluid circuit (block 310). For example, the controller may obtain at least one of the first temperature information, the second temperature information, or the third temperature information, as described above. The second temperature information may indicate an inlet temperature of the first fluid at an inlet of a refrigeration unit or a heating unit in the first fluid circuit, and an outlet temperature of the first fluid at an outlet of the refrigeration unit or the heating unit.

As further shown in FIG. 3, process 300 may include causing, based on at least one of the first temperature information, the second temperature information, or the third temperature information, at least one of the first fluid or the second fluid to be directed to a heat exchanger, in the first fluid circuit and in the second fluid circuit, to cool or heat the second fluid using the first fluid (block 320). For example, the controller may cause, based on at least one of the first temperature information, the second temperature information, or the third temperature information, at least one of the first fluid or the second fluid to be directed to the heat exchanger, as described above.

The first fluid and/or the second fluid may be caused to be directed to the heat exchanger based on at least one of the first temperature information satisfying a first threshold, the second temperature information satisfying a second threshold, or the third temperature information satisfying a third threshold. Causing the first fluid and/or the second fluid to be directed to the heat exchanger may include causing actuation of at least one of a first control valve in the first fluid circuit upstream of the heat exchanger or a second control valve in the second fluid circuit upstream of the heat exchanger.

Process 300 may include determining, based on the inlet temperature and the outlet temperature, that a cooling capacity of the refrigeration unit exceeds a cooling requirement of the non-combustion power source, or a heating capacity of the heating unit exceeds a heating requirement of the non-combustion power source, and the first fluid and/or the second fluid may be caused to be directed to the heat exchanger based on determining that the cooling capacity of the refrigeration unit exceeds the cooling requirement or the heating capacity of the heating unit exceeds the heating requirement. Process 300 may include causing a first portion of the second fluid to be directed to the heat exchanger and a second portion of the second fluid to bypass the heat exchanger.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The control system described herein may be used with any machine powered by a non-combustion power source (e.g., one or more batteries and/or one or more fuel cells). For example, the control system may be used in a machine that includes a thermal management system for regulating a temperature of a non-combustion power source. The control system is useful for efficiently utilizing power that is expended by the thermal management system, particularly when a cooling or heating capacity of the thermal management system exceeds a cooling or heating requirement of the non-combustion power source. In some examples, first fluid in a first fluid circuit that includes the thermal management system, and second fluid in a second fluid circuit, may be directed to a heat exchanger in which the first fluid is used to cool or heat the second fluid. The second fluid circuit may be associated with a hydraulic system of the machine, a powertrain of the machine, or a cooling circuit of the machine (other than the first fluid circuit).

Thus, the first fluid provides thermal regulation for the non-combustion power source as well as for the second fluid circuit. In this way, power expended by the thermal management system is efficiently utilized by fully utilizing the cooling capacity and/or the heating capacity of the thermal management system (e.g., when thermal regulation of the non-combustion power source does not fully utilize the cooling capacity and/or the heating capacity). Moreover, by using the first fluid to cool or heat the second fluid, components and systems of the machine that would otherwise be used to cool or heat the second fluid (e.g., radiators, heat exchanges, fans, or the like) may be eliminated, reduced in size, or operated at a reduced level. This may free up space in the machine for other components and systems, may enable a size of the machine to be reduced, may reduce a complexity of the machine, and/or may reduce power consumption. Furthermore, by using the first fluid to cool or heat the second fluid, the second fluid may be cooled or heated faster, thereby improving the speed of a cool-down time or a warm-up time for the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). As used herein, satisfying a threshold may, depending on the context, refer to a value being greater than the threshold, greater than or equal to the threshold, less than the threshold, less than or equal to the threshold, equal to the threshold, not equal to the threshold, or the like.

What is claimed is:

1. A fluid system, comprising: a first fluid circuit configured to circulate a first fluid to cool or heat a non-combustion power source of a machine, the first fluid circuit including at least one of a refrigeration unit to cool the first fluid or a heating unit to heat the first fluid; a second fluid circuit configured to circulate a second fluid; and a heat exchanger in the first fluid circuit and in the second fluid circuit, the heat exchanger configured to cool or heat the second fluid using the first fluid.

2. The fluid system of claim 1, wherein the non-combustion power source is a battery or a fuel cell.

3. The fluid system of claim 1, wherein the second fluid circuit is configured to circulate the second fluid to cool or heat a component of the machine.

4. The fluid system of claim 3, wherein the component is an electronic system, an engine, or an air system.

5. The fluid system of claim 1, wherein the second fluid circuit is configured to circulate the second fluid for use by a component of the machine.

6. The fluid system of claim 5, wherein the component is a hydraulic system or a powertrain.

7. The fluid system of claim 1, wherein the at least one of the refrigeration unit or the heating unit is only the refrigeration unit.

8. The fluid system of claim 1, wherein the at least one of the refrigeration unit or the heating unit is the refrigeration unit and the heating unit.

9. The fluid system of claim 1, wherein the first fluid circuit comprises:
 a first path that includes the at least one of the refrigeration unit or the heating unit; and
 a second path that includes the at least one of the refrigeration unit or the heating unit, and the heat exchanger.

10. A method, comprising:
 obtaining at least one of first temperature information relating to a non-combustion power source of a machine, second temperature information relating to a first fluid, circulated in a first fluid circuit, used to cool or heat the non-combustion power source, or third temperature information relating to a second fluid in a second fluid circuit; and
 causing, based on at least one of the first temperature information, the second temperature information, or the third temperature information, at least one of the first fluid or the second fluid to be directed to a heat exchanger, in the first fluid circuit and in the second fluid circuit, to cool or heat the second fluid using the first fluid.

11. The method of claim 10, wherein the at least one of the first fluid or the second fluid is caused to be directed to the heat exchanger based on at least one of: the first temperature information satisfying a first threshold, the second temperature information satisfying a second threshold, or the third temperature information satisfying a third threshold.

12. The method of claim 10, wherein causing the at least one of the first fluid or the second fluid to be directed to the heat exchanger comprises:
causing actuation of at least one of: a first control valve in the first fluid circuit upstream of the heat exchanger or a second control valve in the second fluid circuit upstream of the heat exchanger.

13. The method of claim 10, wherein the second temperature information indicates an inlet temperature of the first fluid at an inlet of a refrigeration unit or a heating unit in the first fluid circuit, and an outlet temperature of the first fluid at an outlet of the refrigeration unit or the heating unit, and
wherein the method further comprises:
determining, based on the inlet temperature and the outlet temperature, that a cooling capacity of the refrigeration unit exceeds a cooling requirement of the non-combustion power source, or a heating capacity of the heating unit exceeds a heating requirement of the non-combustion power source,
wherein the at least one of the first fluid or the second fluid is caused to be directed to the heat exchanger based on determining that the cooling capacity of the refrigeration unit exceeds the cooling requirement or the heating capacity of the heating unit exceeds the heating requirement.

14. The method of claim 10, further comprising:
causing a first portion of the second fluid to be directed to the heat exchanger and a second portion of the second fluid to bypass the heat exchanger.

15. A control system, comprising:
a first fluid circuit configured to circulate a first fluid to cool or heat a non-combustion power source of a machine, the first fluid circuit including at least one of a refrigeration unit to cool the first fluid or a heating unit to heat the first fluid;
a second fluid circuit configured to circulate a second fluid; and
a heat exchanger, configured to cool or heat the second fluid using the first fluid or to cool or heat the first fluid using the second fluid,
wherein at least one of:
a first control valve, of the first fluid circuit, is configured to direct at least one of the first fluid or the second fluid to the heat exchanger, or
a second control valve, of the second fluid circuit, is configured to direct the at least one of the first fluid or the second fluid to the heat exchanger.

16. The control system of claim 15, further comprising:
the first control valve, in the first fluid circuit upstream of the heat exchanger, configured to control a flow of the first fluid to the heat exchanger.

17. The control system of claim 15, further comprising:
the second control valve, in the second fluid circuit upstream of the heat exchanger, configured to control a flow of the second fluid to the heat exchanger.

18. The control system of claim 15, further comprising:
a bypass passage in the second fluid circuit to bypass the heat exchanger; and
a bypass valve in the second fluid circuit to control a flow of the second fluid to the heat exchanger.

19. The control system of claim 15, wherein a cooling capacity of the refrigeration unit exceeds a cooling requirement of the non-combustion power source, or a heating capacity of the heating unit exceeds a heating requirement of the non-combustion power source.

20. The control system of claim 15, wherein the first fluid circuit comprises:
a first path that includes the at least one of the refrigeration unit or the heating unit; and
a second path that includes the at least one of the refrigeration unit or the heating unit, and the heat exchanger.

* * * * *